United States Patent Office 2,915,492
Patented Dec. 1, 1959

2,915,492

PHENOLIC RESIN AND 3,9-DIALKENYLSPIROBI (M-DIOXANE) REACTION PRODUCTS AND PROCESS FOR HARDENING SAME

Joseph E. Wilson, Highland Park, and Richard K. Walton, North Plainfield, N.J., assignors to Union Carbide Corporation, a corporation of New York No Drawing. Application December 27, 1956
Serial No. 630,740

15 Claims. (Cl. 260—43)

This invention relates to a new type of phenolic resin.

The classic phenolic resin is based upon a condensation product of phenol and formaldehyde. When prepared in the presence of an acid catalyst, the initial resin is a heat-hardenable, fusible material, which further condenses to a hard solid upon the addition of a curing agent, such as hexamethylenetetramine. During such curing, gases are evolved, which necessitates high pressure molding cycles.

We have discovered that phenolic resins of the novolac type may be cured to hard and tough polymers without the evolution of gases or fumes by the use of certain unsaturated acetals as curing agents. These unsaturated acetals are 3,9-dialkenylspirobi(m-dioxanes) of the formula:

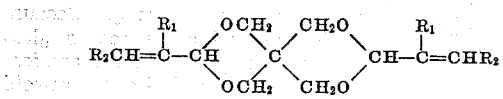

where $R_1$ is a chlorine, hydrogen or methyl and $R_2$ is hydrogen or methyl.

These 3,9-dialkenylspirobi(m-dioxanes) cure the phenolic resins by a novel reaction mechanism. The alkenyl groups of the acetal add to the reactive ring positions in the phenolic resin, i.e., the unsubstituted ring positions which are ortho or para to the phenolic hydroxyl groups. In order for cross-linking to occur, there must be more than two such reactive positions in the average resin molecule; and the degree of cross-linking will increase with the number of such positions which are available. Other things being equal, the maximum degree of cure will be obtained when the resins and the acetals are reacted in reciprocal proportions to their functionality. Thus, the acetal has a functionality of two by virtue of the two reactive alkenyl groups, and the functionality of the resins is represented by the average number of unsubstituted ring positions which are ortho or para to phenolic hydroxyl groups. For example, a resin which contains an average of four such positions per molecule should be reacted for maximum cure with the 3,9-dialkenylspirobi(m-dioxanes) in the molar ratio of 1:2, respectively.

These so-called novolac or two-step resins are prepared by condensing, generally in the presence of an acidic catalyst, a phenolic material (such as phenol, cresol, xylenol, butylphenol, phenylphenol and other substituted phenols, mixed phenols and tar acids, and the like) with less than a molar proportion of an aldehyde or a ketone (such as formaldehyde—in the form of either formalin or paraformaldehyde, acetaldehyde, butyraldehyde, acetone, and the like). Such resins can be further condensed and heat-hardened upon the addition thereto of a curing agent such as hexamethylenetetramine. During this curing reaction, gaseous by-products are evolved; and the curing and molding operations must therefore be carried out under high pressure to provide acceptably bubble- and blister-free products.

Structurally, a novolac resin consists almost exclusively of unsubstituted or substituted phenolic nuclei joined together by methylene or substituted methylene links. The equivalent weight of such a resin is equal to its average molecular weight divided by its functionality, where functionality denotes the average number of reactive sites per molecule. Generally, the reactive sites are those positions in the phenolic rings which are unsubstituted and ortho or para to the respective phenolic hydroxyl groups. Accordingly, the functionality, F, of a novolac resin having an average molecular weight M and made by condensing a phenolic compound or mixture having an average monomeric molecular weight $p$ and average functionality $f$ with a carbonyl, i.e., aldehydic or ketonic, compound or mixture having an average monomeric molecular weight $c$ can be calculated, in most instances, from the equation, (I) $$F = \frac{M+c-18}{p+c-18}(f-2)+2$$

For novolac resins made from phenol and formaldehyde, this reduces to (II) $$F = \frac{M+12}{106}+2$$

and the equivalent weight of such phenol-formaldehyde resins is therefore substantially equal to $$\text{Eq. wt.} = \frac{106M}{M+224}$$

The equivalent weight of the dialkenylspirobi compounds is equal to ½ their molecular weight.

As indicated above, the maximum degree of cure is obtained when an equivalent weight of a novolac resin is reacted with an equivalent weight of the 3,9-dialkenylspirobi(m-dioxane). However, useful cured resins can be obtained in reactant ratios varying from 0.25 to 4, and preferably from 0.75 to 1.25, equivalents of novolac resin per equivalent weight of the dialkenylspirobi (m-dioxane).

The resinification reaction between the phenolic resin and the divinylspirobi(m-dioxane) is catalyzed by acids or acid-reacting substances. Effective catalysts include strong acids, such as toluenesulfonic, benzenesulfonic, or sulfuric acids; and acid-reacting materials, such as diethyl sulfate.

Less effective catalysts include weaker acids, such as phosphoric acid, and Lewis acids (electron accepting compounds) such as aluminum chloride, stannic chloride, zinc chloride, ferric chloride or titanium tetrachloride. As little as 0.1% acid, based on both reactants, will catalyze the initial reaction between the phenolic resin and the unsaturated acetal. However, the curing or hardening of the resin is accelerated by higher acid concentrations, of around 0.3%. Thus the amount of acid may be varied, and suitable amounts include the range of from 0.01% to 2%.

Reaction between the phenolic resin and the unsaturated acetal may be initiated by simply mixing the reactants and catalysts and heating. If desired, an inert diluent, such as an ether or a hydrocarbon may be used to facilitate handling the reaction mixture.

The initial reaction product, after removal of any inert diluent, is a heat-hardenable, fusible material which may be either a viscous liquid or a low-melting solid. If allowed to stand at room temperature without neutralization of the catalyst, the initial reaction product will eventually form a hard polymer. The curing reaction, therefore, is accelerated by heating; a few hours being required at 70° C., and a few minutes at 150° C. The physical properties of the polymer, such as the heat distortion values, are improved by curing at the higher temperatures. If the initial reaction catalyst is neutralized with a base, such as sodium carbonate, calcium carbonate or sodium acetate, the neutralized heat-hardenable resins will be more stable on storage. The neutralized resins may be cured by adding additional acid and heating in the same manner. As previously noted, no gases are released during the curing cycle.

Any of the monohydric phenols are suitable for making the phenolic resins useful in this invention, such as phenol, mixed cresols, m-xylenol, beta-naphthol, or mixtures of phenols from coal tar or coal hydrogenation fractions. Substituted phenols, such as chlorophenols may also be used. If desired, mixtures of such phenols with the phenolic resins may also be reacted with the unsaturated acetals to form polymers.

In addition to the 3,9-divinylspirobi(m-dioxane), which is preferred, the following unsaturated acetals may also be used for reaction with phenolic resins:

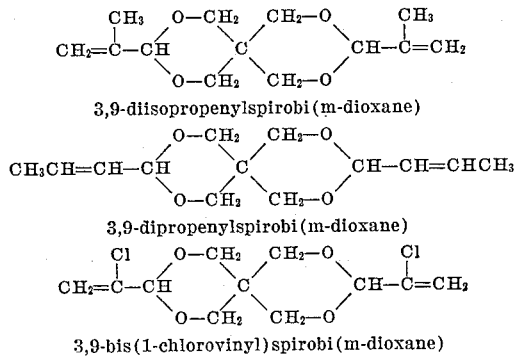

3,9-diisopropenylspirobi(m-dioxane)

3,9-dipropenylspirobi(m-dioxane)

3,9-bis(1-chlorovinyl)spirobi(m-dioxane)

The cured polymers from phenolic resins and 3,9-divinylspirobi(m-dioxane) are solid, bubble-free and, in the absence of fillers, usually translucent to transparent. The resins thermoset to infusible, insoluble products and show substantially no thermoplasticity at 150° C. Shrinkage, on molding, is low and the molded pieces are tough, impact-resistant and easy to machine. If cured in contact with glass, a good resin to glass bond is obtained.

Such copolymers of the dialkenylspirobi(m-dioxane) and phenolic resin are useful in shell molding and as a binder for abrasive particles in making grinding wheels. Their adherence to glass indicates utility in making laminates from glass fiber and glass fabric. The fact that no water or other volatile by-product is liberated during curing gives the copolymers of this invention a decided advantage over conventional phenolic resins in potting, encapsulating coating and casting applications. In general, these new resins can be used in many of the applications now served by conventional phenolic, epoxy or polyester resins. The electrical properties of the new copolymers are superior to those of conventional unfilled phenolic resins, and are superior in some respects to electrical grade mica-filled phenolics.

This new type of copolymers of phenolic novolac resins and dialkenylspirobi(m-dioxanes) is particularly useful as molding compositions, and the fact that they release no gases or fumes on molding gives them a pronounced advantage over the conventional novolac resins cured with hexamethylenetetramine, enabling low pressure molding techniques to be employed and insuring the formation of bubble-free molded articles. For such molding applications it is desirable to pre-mix the spirobi compound and the novolac resin with fillers, such as wood flour, asbestos, or diatomaceous earth, lubricants, such as stearic acid. Also, in such applications, it is desirable to pre-mix a catalyst of a special type, which releases its acid at molding temperatures. In this manner, stable molding powders may be prepared. Such catalysts are the dialkyl sulfates, such as dimethyl, diethyl, diisopropyl and di-secondary butyl sulfates. These catalysts decompose at molding temperatures to release sulfuric acid which is the active catalyst.

If desired, the flexibility and impact strength of the phenolic resins cured with the divinyl acetals may be increased by adding an amount of a polyol to the mixture up to an equal amount by weight of the phenolic resin. Such polyols enter into the polymer being formed by reaction of the hydroxyl groups with the free vinyl groups of the acetal or of the growing polymer molecule to form ether linkages. This mode of addition is different from that of the phenolic resins, which do not cross-link through the phenolic hydroxyl group, but instead at the reactive ring positions which are ortho and para to the phenolic hydroxyl groups. The polyols which are useful in forming the copolymers of this invention include any of the aliphatic polyhydric alcohols, such as ethylene glycol, propylene glycol, glycerol, polyethylene and polypropylene glycols, 1,2,4-butanetriol, butylene glycol, pentamethylene glycol, hexanediol-1,6, 2-ethylhexanediol-1,3, trimethylolethane and trimethylolpropane.

The following examples will serve to illustrate the invention:

EXAMPLE I 83.7 grams of a novolac resin were reacted with 63.0 grams of 3,9-divinylspirobi(m-dioxane) in the presence of 0.037 gram (0.025 percent) of p-toluenesulfonic acid monohydrate as a catalyst. In carrying out the reaction, the novolac resin was melted, and then the catalyst and melted spirobi compound were added thereto in that order and stirred to form a thick solution. This product was cast into round tin boxes and cured for 5 minutes at 150° C.

The cured polymer was solid at 150° C. The surface of the polymer was very smooth and quite mar-resistant. Its adherence to glass was extremely strong. Because of its excellent mar-resistance and adherence to glass this polymer is useful in a number of commercial applications where these qualities are desired. Also, the spirobi compound cross-links the novolac resin without the evolution of any gaseous products.

The specific gravity of the cured product was 1.251. The Barcol Hardness was 51. The Barcol Hardness values of the copolymers covered approximately the same range as that covered by commercially available polyester resins which range from about 30 to about 55. The electrical properties of the cured polymer, designated resin A in Table I, can be seen to be superior to those of a typical unfilled phenolic resin (Table I). The power factor and dielectric constant are lower than that of the conventional phenolic resin, while the volume resistivity is higher by at least a factor of $10^4$. Even the mica-filled phenolics especially designed for electrical use have a volume resistivity of $10^9$ megohm cm., which is less than the corresponding value for the copolymer of the novolac resin and the spirobi compound.

The novolac resin used in this example was prepared as follows:

A mixture of 100 parts phenol and 69 parts of 37% aqueous formalin was adjusted to pH 1 with oxalic acid, refluxed at atmospheric pressure for 6 hours, dehydrated by distilling off the water under about 25–26 inches of vacuum to a mass temperature of 150° C., then discharged and cooled. A 35% solution of said resin in 95% ethanol had a viscosity of 15 cst. at 25° C.; and mixture of said resin and 10% its own weight of hexamethylenetetramine had a 150° C. hot plate gel time of 80–100 seconds. Its average molecular weight was about 500.

EXAMPLE II

A thermosetting material was prepared from 46.5 grams of the same novolac resin, 52.7 grams of 3,9-divinylspirobi(m-dioxane), 10.4 grams pentamethylene glycol, and 0.075 gram (0.068 percent) p-toluenesulfonic acid monohydrate. The novolac resin was melted and then the glycol, catalyst, and melted spirobi compound were added with stirring, in that order. The gel time of the resulting product was 73 seconds at 150° C. Samples were cast and cured for 5 minutes at 150° C. The cured samples were fairly hard at 150° C., dark amber, and transparent. The specific gravity of the cured material was 1.241. Seven-day immersion tests at room temperature gave a weight gain of 0.54 percent in water, 0.46 percent in one percent sodium hydroxide, and 0.19 percent in 30 percent sulfuric acid. These values are exceptionally low for resins of this class. The Barcol Hardness of the cured polymer was 44. Electrical properties of this product, (resin B in Table I) were superior to those of unfilled phenolics and equal or superior to those of mica-filled phenolics.

The electrical properties of the novolac resins cured with the 3,9-divinylspirobi(m-dioxane), in comparison with conventional phenolic resins are given in the following table wherein P.F. denotes power factor and D.C. denotes dielectric constant.

Table I

| Resin | 60 Cycles | | 1 Kilocycle | | 1 Megacycle | | Volume Resistivity, Megohm-cm. |
|---|---|---|---|---|---|---|---|
| | P.F. | D.C. | P.F. | D.C. | P.F. | D.C. | |
| Unfilled phenolic resin | 0.06–0.1 | 5–6.5 | 0.03–0.08 | 4.5–6 | 0.015–0.03 | 4.5–5 | $10^5$–$10^6$ |
| Mica-filled phenolic resin | 0.02 | 5.1 | 0.014 | 5.0 | .014 | 4.7 | $10^8$–$10^9$ |
| Resin A | 0.00333 | 3.91 | 0.00885 | 3.78 | 0.0185 | 3.50 | $2.03 \times 10^{10}$ |
| Resin B | 0.00251 | 3.95 | 0.00140 | 3.85 | 0.0210 | 3.51 | $1.20 \times 10^{10}$ |

EXAMPLE III

The following ingredients were mixed and compounded on a 6 x 12 inch two-roll mill at 100° C.:

| | Parts by weight |
|---|---|
| 3,9-divinylspirobi(m-dioxane) | 20 |
| Novolac resin (as in Example I) | 30 |
| Wood flour | 50 |
| Diethyl sulfate | 0.25 |
| Stearic acid | 1.0 |

The fluxed sheet obtained from the mill was pulverized and the granules were molded into a 2″ diameter disc. The molding operation was carried out at 155° C. and at a pressure of 1000 p.s.i. for a period of 5 minutes. By raising the catalyst concentration, the curing time can be decreased still further. The molded disc was strong, tough and smooth, and showed no evidence of gas evolution or porosity. The color of the disc was a light tan, and its Barcol Hardness was 35.

EXAMPLE IV

A novolac resin was prepared in the usual manner from 78 parts p-t-butylphenol, 22 parts of Bisphenol A (from phenol and acetone) and 63 parts of 37% formaldehyde using an oxalic acid catalyst. Its average molecular weight was about the same as that of the previous examples.

Fifteen (15) grams of this novolac resin and 10 grams of 3,9-divinylspirobi(m-dioxane) were melted at 160° C. in a beaker on a hot plate. The solution was removed from the hot plate, about 0.04 gram of diethyl sulfate added, and the solution cured for 5 minutes in an oven at 150° C. The cured polymer was dark and opaque and substantially bubble-free. It was insoluble and infusible, and its Barcol Hardness was 40.

A similar product, prepared from the novolac resin and the diethyl sulfate alone in the same way, was full of bubbles and crumbled at the touch.

What is claimed is:

1. A copolymer consisting of a novolac resin said resin consisting essentially of phenolic nuclei joined together by a member selected from the group consisting of methylene and substituted methylene links, said novolac resin containing an average of more than two reactive positions per molecule and a 3,9-dialkenylspirobi(m-dioxane) having from 2 to 3 carbon atoms in the alkenyl radical.

2. A copolymer consisting of a novolac resin said resin consisting essentially of phenolic nuclei joined together by a member selected from the group consisting of methylene and substituted methylene links, said novolac resin containing an average of more than two reactive positions per molecule and 3,9-diisopropenylspirobi(m-dioxane).

3. A copolymer consisting of a novolac resin said resin consisting essentially of phenolic nuclei joined together by a member selected from the group consisting of methylene and substituted methylene links, said novolac resin containing an average of more than two reactive positions per molecule and 3,9-dipropenylspirobi(m-dioxane).

4. A copolymer consisting of a novolac resin said resin consisting essentially of phenolic nuclei joined together by a member selected from the group consisting of methylene and substituted methylene links, said novolac resin containing an average of more than two reactive positions per molecule and 3,9-bis(1-chlorovinyl)spirobi-(m-dioxane).

5. A copolymer consisting of a novolac resin said resin consisting essentially of phenolic nuclei joined together by a member selected from the group consisting of methylene and substituted methylene links, said novolac resin containing an average of more than two reactive positions per molecule and 3,9-divinylspirobi(m-dioxane).

6. A copolymer consisting of a phenol-formaldehyde novolac resin containing an average of more than two reactive positions per molecule and 3,9-divinylspirobi-(m-dioxane).

7. A copolymer consisting of a phenol-formaldehyde novolac resin having an average of more than two reactive positions per molecule, a monohydric phenol, and 3,9-divinylspirobi(m-dioxane).

8. A copolymer consisting of a phenol-formaldehyde novolac resin, having an average of more than two reactive positions per molecule, an aliphatic polyhydric alcohol, and 3,9-divinylspirobi(m-dioxane).

9. A copolymer consisting of a phenol-formaldehyde novolac resin having an average of more than two reactive positions per molecule, pentamethylene glycol, and 3,9-divinylspirobi(m-dioxane).

10. A copolymer consisting of an alkyl-substituted phenolformaldehyde novolac resin having an average of more than two reactive positions per molecule and 3,-9-divinylspirobi(m-dioxane).

11. A thermosetting composition consisting of a novolac resin which consists essentially of phenolic nuclei joined together by a member selected from the group consisting of methylene and substituted methylene links, said novolac resin having an average of more than two reactive positions per molecule, a 3,9-dialkenylspirobi(m-dioxane) having from 2 to 3 carbon atoms in the alkenyl radical, and an acid catalyst.

12. A thermosetting composition consisting of a phenol-formaldehyde novolac resin having an average of more than two reactive positions per molecule, 3,9-divinyl-spirobi(m-dioxane) and an acid catalyst.

13. A thermosetting molding composition consisting of a phenol-formaldehyde novolac resin having an average of more than two reactive positions per molecule, 3,9-divinylspirobi(m-dioxane), a filler and diethyl sulfate.

14. Process for hardening novolac resins said resin consisting essentially of phenolic nuclei joined together by a member selected from the group consisting of methylene and substituted methylene links, said novolac resin containing an average of more than two reactive positions per molecule which comprises heating said resins in the presence of an acidic catalyst with a 3,9-dialkenylspirobi(m-dioxane) having from 2 to 3 carbon atoms in the alkenyl radical to form a copolymer consisting of said novolac resins and a 3,9-dialkenylspirobi(m-dioxane).

15. Process for hardening phenol-formaldehyde novolac resins containing an average of more than two reactive positions per molecule which comprises heating said resins in the presence of an acidic catalyst with 3,9-divinylspirobi(m-dioxane) to form a copolymer consisting of said novolac resins and 3,9-divinylspirobi(m-dioxane).

References Cited in the file of this patent

UNITED STATES PATENTS

| 2,025,044 | Dreyfus | Dec. 24, 1935 |
| 2,401,776 | Rothrock | June 11, 1946 |
| 2,687,407 | Orth | Aug. 24, 1954 |

FOREIGN PATENTS

| 733,996 | Great Britain | July 20, 1955 |
| 868,351 | Germany | Feb. 23, 1953 |